(12) United States Patent
Sawamoto et al.

(10) Patent No.: US 6,583,826 B1
(45) Date of Patent: Jun. 24, 2003

(54) INTERMEDIATE FREQUENCY CIRCUIT IN TELEVISION TUNER WITH LARGE ATTENUATION OF AUDIO IF SIGNAL IN ADJACENT CHANNEL

(75) Inventors: Hiroyuki Sawamoto, Fukushima-ken (JP); Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 358 days.

(21) Appl. No.: 09/580,137

(22) Filed: May 30, 2000

(30) Foreign Application Priority Data

May 31, 1999 (JP) .......................... 11-151788

(51) Int. Cl.[7] ................................ H04N 5/50
(52) U.S. Cl. ................ 348/731; 348/725; 348/729; 455/188.1; 455/180.4
(58) Field of Search ................ 348/725, 729, 348/731, 736, 737, 738; 455/188.1, 179.1, 180.1, 180.04, 189.1, 212, 234.1; H04N 5/44, 5/50, 5/46

(56) References Cited

U.S. PATENT DOCUMENTS 4,066,845 A * 1/1978 Kishi ......................... 455/212
5,220,686 A * 6/1993 Kasperkovitz et al. ... 455/234.1
5,523,801 A * 6/1996 Tanaka et al. ............... 348/737
6,333,765 B1 * 12/2001 Okada et al. ................ 348/678

FOREIGN PATENT DOCUMENTS

| JP | 6-311388 A2 | 11/1991 | |
| JP | 8-163454 A1 | 6/1996 | |
| JP | 08-163454 | * 6/1996 | ............ H04N/5/44 |

* cited by examiner

*Primary Examiner*—John Miller
*Assistant Examiner*—Trang U. Tran
(74) *Attorney, Agent, or Firm*—Brinks Hofer Gilson & Lione

(57) ABSTRACT

The present invention resides in the provision of an intermediate frequency circuit in a television tuner capable of enlarging the attenuation of a audio IF carrier in an adjacent channel without increasing a loss in an intermediate frequency band. The intermediate frequency circuit comprises a mixer which outputs an intermediate frequency signal, an intermediate frequency amplifier for amplifying the intermediate frequency signal outputted from the mixer 1, and a feedback circuit disposed between an input end and an output end of the intermediate frequency amplifier, and in the intermediate frequency circuit, a audio IF carrier of an adjacent intermediate frequency signal adjacent to the intermediate frequency signal is fed back from the output end to the input end of the intermediate frequency amplifier by the feedback circuit.

3 Claims, 4 Drawing Sheets

INTERMEDIATE FREQUENCY CIRCUIT IN TELEVISION TUNER WITH LARGE ATTENUATION OF AUDIO IF SIGNAL IN ADJACENT CHANNEL

BACKGROUND OF THE INVENTION

1. Field of the Invention

The present invention relates to an intermediate frequency circuit in a television tuner.

2. Description of the Prior Art

As shown in FIG. 6, an intermediate frequency circuit in a conventional television tuner, which circuit in the conventional television tuner will hereinafter be referred to simply as "intermediate frequency circuit," has an intermediate frequency tuning circuit ("IF tuning circuit" hereinafter) 22 which tunes to an intermediate frequency signal, IF, outputted from a mixer 21, a trap circuit 23 which attenuates a audio IF carrier in a lower adjacent channel, and intermediate frequency amplifier ("IF amplifier" hereinafter) 24.

A television signal, RF, in a reception channel selected by a tuning circuit (not shown) is inputted at balance to the mixer 21, in which it is mixed with a local oscillation signal inputted at balance from a local oscillator 25 and is frequency-converted to the intermediate frequency signal, IF. The intermediate frequency signal, IF, is outputted at balance from the mixer 21 and is passed through the IF tuning circuit 22, whereby signals adjacent to both sides of the intermediate frequency signal, IF, are attenuated. The trap circuit 23, which is constituted of a parallel resonance circuit, is disposed between the IF tuning circuit 22 and the IF amplifier 24. The trap circuit 23 is inserted in series into one signal line. The resonance frequency (trap frequency) of the trap circuit 23 is made coincident with the frequency (60.25 MHz according to the television specification in Japan) of an adjacent audio carrier in an intermediate frequency band.

FIG. 7 shows an intermediate frequency circuit using an integrated circuit component 26 including a mixer 21, an IF amplifier 24 and a local oscillator 25 which are formed within a single package. The integrated circuit component 26 is provided with two output terminals 26a and 26b of the mixer 21 and two input terminals 26c, 26d and two output terminals 26e, 26f of the IF amplifier 24. An intermediate frequency signal, IF, outputted from the mixer 21 is inputted to the two input terminals 26c and 26d in the integrated circuit component 26 via an IF tuning circuit 22 and a trap circuit 23 which are disposed outside the integrated circuit component 26. The intermediate frequency signal, after amplified by the IF amplifier 24, is outputted at balance from the output terminals 26e and 26f.

The conventional intermediate frequency circuit thus configured has a frequency characteristic (response) in an intermediate frequency band such that, as shown in FIG. 8, a video IF carrier, P, (say 58.75 MHz in Japanese channel) and a audio IF carrier, (likewise, 54.25 MHz) are at almost the same level and that the level of a audio IF carrier (S–1) in an adjacent channel attenuates 8 dB or so with respect to a peak level. The attenuation value depends on the quality factor Q of the trap circuit 23 itself and a circuit impedance such as an input impedance of the IF amplifier 24. The higher the value of Q of the trap circuit 23 itself and the lower the circuit impedance, the larger the attenuation value. However, taking into account the balance between Q of the trap circuit 23 which is obtained in a practical range and the circuit impedance, there is determined such a degree of attenuation value as shown in FIG. 8.

At the attenuation value obtained in the above conventional intermediate frequency circuit the disturbance by the audio IF carrier in the adjacent channel is not negligible, thus requiring a still larger attenuation value. However, a limit is encountered in making Q of the trap circuit 23 itself high. Lowering the circuit impedance may be a solution, but lowering the circuit impedance gives rise to the problem that the loss in the intermediate frequency band increases. Further, since the trap circuit is inserted in series into a signal line, the integrated circuit component including the mixer 21 and the IF amplifier 24 is required to be provided with input terminals of the IF amplifier, with consequent increase in cost of the integrated circuit component.

The present invention has been accomplished in view of the above-mentioned problems and it is an object of the invention to provide an intermediate frequency circuit in a television tuner capable of enlarging the attenuation value of a audio IF carrier in an adjacent channel without increasing the loss in an intermediate frequency band.

It is another object of the present invention to permit the use of an integrated circuit component including a mixer and an IF amplifier and not provided with input terminals for the IF amplifier, in case of constituting an intermediate frequency circuit by using the integrated circuit component.

SUMMARY OF THE INVENTION

According to the present invention, for achieving the above-mentioned objects, there is provided an intermediate frequency circuit in a television tuner, comprising a mixer which outputs an intermediate frequency signal, an intermediate frequency amplifier for amplifying the intermediate frequency signal outputted from the mixer, and a feedback circuit disposed between an input end and an output end of the intermediate frequency amplifier, wherein a audio IF carrier of an adjacent intermediate frequency signal adjacent to the intermediate frequency signal is fed back from the output end to the input end by the intermediate frequency amplifier by the feedback circuit.

Preferably, the feedback circuit is constituted of a series resonance circuit connected between the input and output ends of the intermediate frequency amplifier, and a resonance frequency of the series resonance circuit is made coincident with the frequency of the audio IF carrier.

Preferably, a parallel resonance circuit is connected between the input end of the intermediate frequency amplifier and the ground, a coupling coil is inductively coupled to a resonance coil in the parallel resonance circuit and is connected at one end thereof to the output end of the intermediate frequency amplifier, an amplified intermediate frequency signal is taken out from an opposite end of the coupling coil, the feedback circuit is constituted of both the parallel resonance circuit and the coupling coil, and a resonance frequency of the parallel resonance circuit is made coincident with the frequency of the audio IF carrier.

Preferably, a low-pass filter is provided at the output end of the intermediate frequency amplifier, and a coil of the low-pass filter also serves as the coupling coil.

DETAILED DESCRIPTION OF PREFERRED EMBODIMENTS

Intermediate frequency circuits in television tuners according to the present invention, each of which circuits in television tuners will hereinafter be referred to simply as "intermediate frequency circuit," will be described below with reference to FIGS. 1 to 5.

Figure 1:
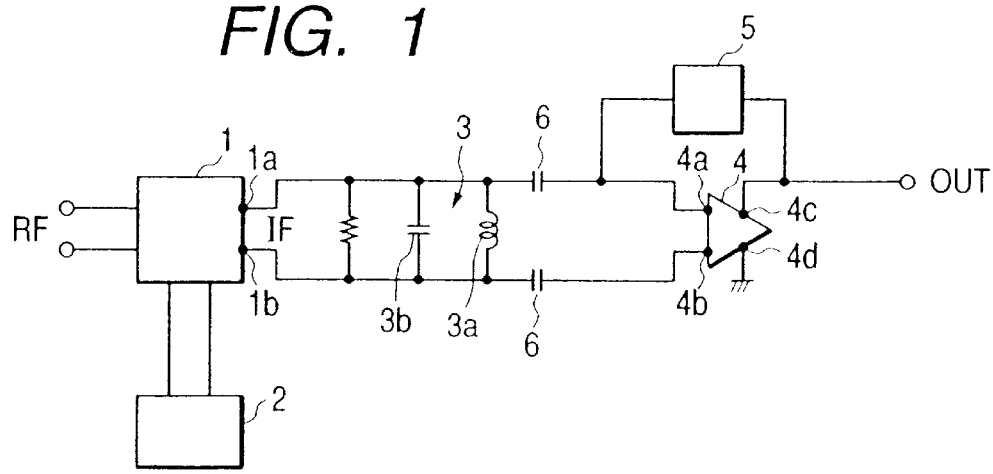
FIG. 1 is a circuit diagram showing a basic configuration of an intermediate frequency circuit in a television tuner according to the present invention.

Reference is here made first to FIG. 1, which illustrates a basic configuration of an intermediate frequency circuit according to the present invention. The intermediate frequency circuit includes a mixer 1, a local oscillator 2 from which a local oscillation signal is inputted to the mixer 1, an intermediate frequency tuning circuit ("IF tuning circuit" hereinafter) which tunes to an intermediate frequency signal, IF, provided from the mixer 1, an intermediate frequency amplifier ("IF amplifier" hereinafter) 4 for amplifying the intermediate frequency signal, IF, and a feedback circuit 5 connected between an input end and an output end of the IF amplifier 4.

A television signal, RF, in a reception channel selected by an RF tuning circuit (not shown) is inputted at balance to the mixer 1, in which it is mixed with the local oscillation signal inputted at balance from the local oscillator 2 and is frequency-converted to the intermediate frequency signal, IF. The intermediate frequency signal, IF, is outputted at balance from the mixer 1 and passes through the IF tuning circuit 3, whereby signals adjacent to both sides of the intermediate frequency signal are attenuated. The IF tuning circuit 3 is constituted of a parallel tuning circuit comprising a coil 3a and a capacitor 3b and is connected between balance output terminals 1a and 1b of the mixer 1. The intermediate frequency signal, IF, which has passed through the IF tuning circuit 3 is inputted at balance to input ends 4a and 4b of the IF amplifier 4 via a pair of DC cut-off capacitors 6 if necessary.

The IF amplifier 4 has balance output ends 4c and 4d, one output end 4d being connected to the ground high-frequencywise, resulting in that the output of the IF amplifier 4 is an unbalance output. The feedback circuit 5 is disposed between one input end 4a and the other output end 4c. The feedback circuit 5 is constituted of a resonance circuit so that at the resonance frequency thereof a negative feedback is applied to the input end 4a from the output end 4c of the IF amplifier 4 (that is, a signal opposite in phase to the inputted intermediate frequency signal, IF, is applied to the input end 4a). Therefore, if the resonance frequency of the feedback circuit 5 is made coincident with the frequency (60.25 MHz according to the television specification in Japan) of an adjacent audio carrier in the intermediate frequency band, it is possible to attenuate the audio carrier in a channel adjacent to the television signal which is received.

By enlarging the gain (amplification degree) of the IF amplifier 4, a large negative feedback value is obtained and so is the attenuation value.

Figure 2:
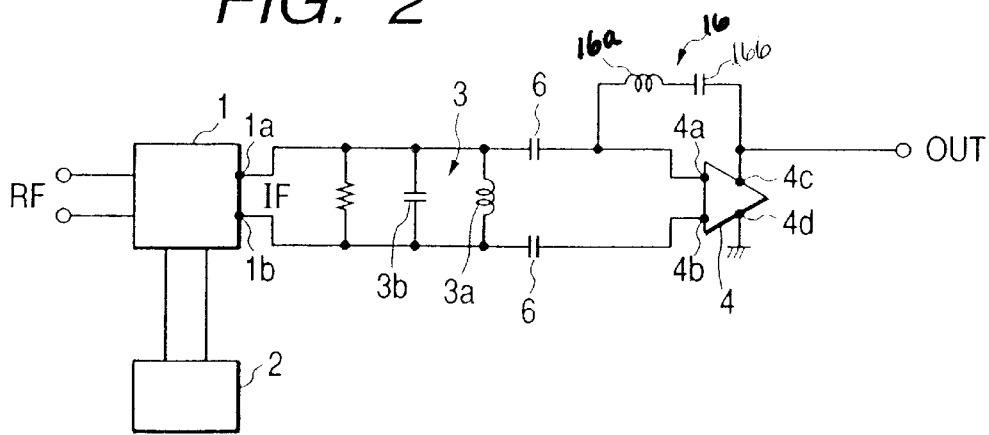
FIG. 2 is a circuit diagram showing a concrete configuration of an intermediate frequency circuit in a television tuner according to an embodiment of the present invention.

In FIG. 2, the feedback circuit 5 is constituted of a series resonance circuit 6, which is connected between the input end 4a and the output end 4c of the IF amplifier 4. A series resonance frequency induced by a coil 6a and a capacitor 6b is made coincident with the frequency (60.25 MHz according to the television specification in Japan) of an adjacent audio carrier in the intermediate frequency band, and the intermediate frequency signal outputted from the IF amplifier 4 is fed back to the input side so that the phase of the fed-back signal becomes opposite to the phase of the intermediate frequency signal inputted from the IF tuning circuit 3 side, whereby a feedback loop is formed at the frequency of the adjacent audio carrier and attenuation is effected at this frequency.

Figure 3:
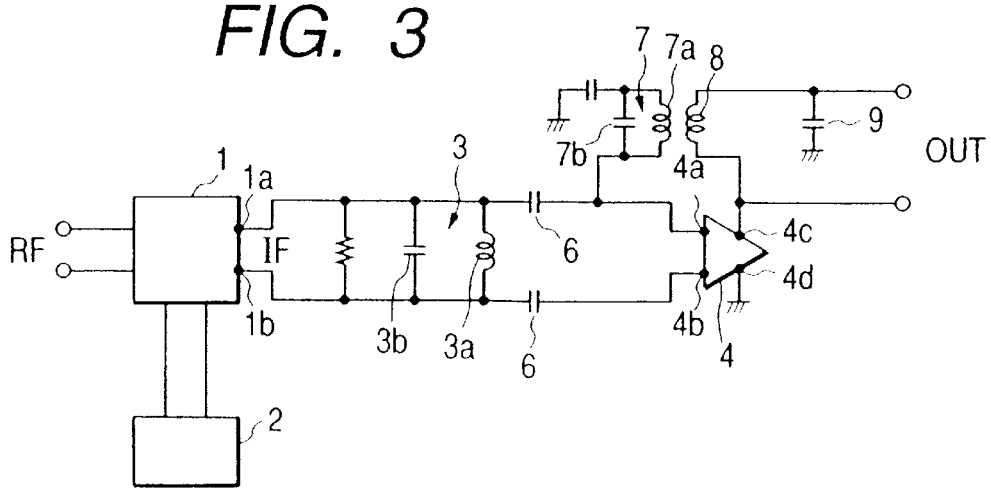
FIG. 3 is a circuit diagram showing a concrete configuration of an intermediate frequency circuit in a television tuner according to another embodiment of the present invention.

In FIG. 3, the feedback circuit 5 is composed of a parallel resonance circuit 7 and a coupling coil 8 of the IF amplifier 4. The parallel resonance circuit 7, which comprises a coil 7a and a capacitor 7b, is connected between the input end 4a of the IF amplifier 4 and the ground. The coil 7a and the coupling coil 8 are disposed so as to be inductively coupled together.

The resonance frequency of the parallel resonance circuit 7 is made coincident with the frequency (60.25 MHz according to the television specification in Japan) of an adjacent audio carrier in the intermediate frequency band and the intermediate frequency signal outputted from the IF amplifier 4 is fed back to the input side so that the phase of the fed-back signal becomes opposite to the phase of the intermediate frequency signal, IF, inputted from the IF tuning circuit 3 side, whereby a negative feedback loop is formed at the frequency of the adjacent audio carrier and attenuation is effected at this frequency.

The coupling coil 8 constitutes a low-pass filter together with the capacitor 9 and serves also as part of the feedback circuit 5.

Figure 4:
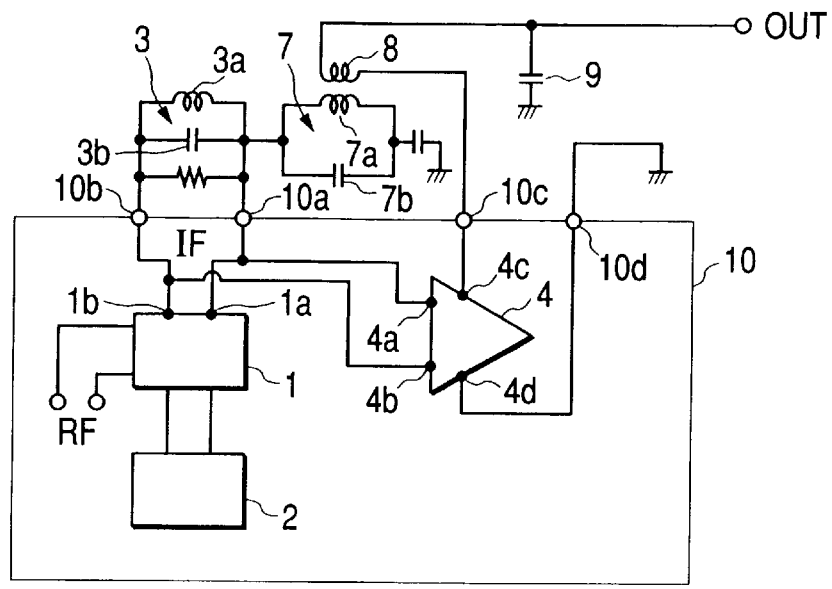
FIG. 4 is a circuit diagram of an intermediate frequency circuit in a television tuner, configured using an integrated circuit component, according to a further embodiment of the present invention.

FIG. 4 illustrates an intermediate frequency circuit using an integrated circuit component 10 including a mixer 1, a local oscillator 2 and an IF amplifier 4 which are formed within a single package. The integrated circuit component 10 is provided with output terminals 10a and 10b connected to two output ends 1a and 1b of the mixer 1 and further provided with output terminals 10c and 10d connected to two output ends 4c and 4d of the IF amplifier 4. Within the integrated circuit component 10, the output end la of the mixer 1 and an input end 4a of the IF amplifier 4 are connected together and likewise the output end 1b of the mixer 1 and an input end 4b of the IF amplifier 4 are connected together. An IF tuning circuit 3 is connected between the output terminals 10a and 10b. A parallel resonance circuit 7 is connected between one output terminal 10a and the ground. On the other hand, a low-pass filter composed of a coupling coil 8 and a capacitor 9 is connected to the output terminal 10c which is connected to the IF amplifier 4. The parallel resonance circuit 7 is disposed so that a coil 7a thereof and the coupling coil 8 are coupled together.

Although in the configuration of FIG. 4 the feedback circuit 5 is constituted by using the parallel resonance circuit 7, a negative feedback loop can also be formed even by connecting the series resonance circuit 6 between the output terminals 10a and 10c.

Figure 5:
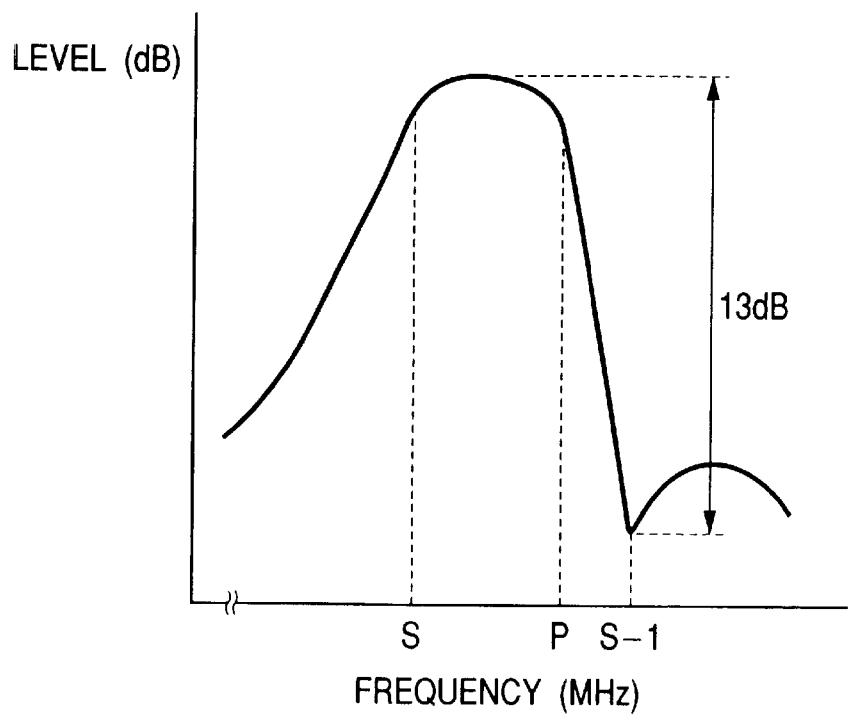
FIG. 5 is a frequency characteristic diagram of an intermediate frequency circuit in a television tuner according to the present invention.
Figure 6:
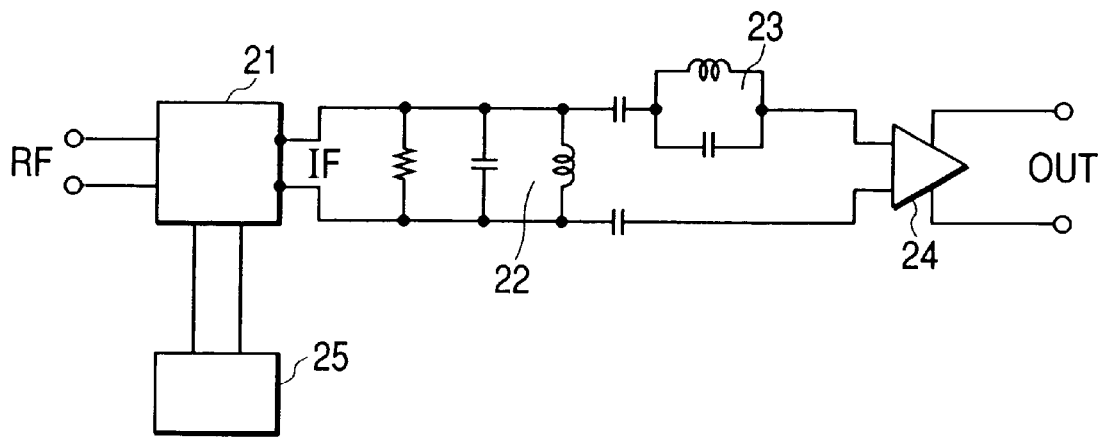
FIG. 6 is a circuit diagram showing the configuration of an intermediate frequency circuit in a conventional television tuner.
Figure 7:
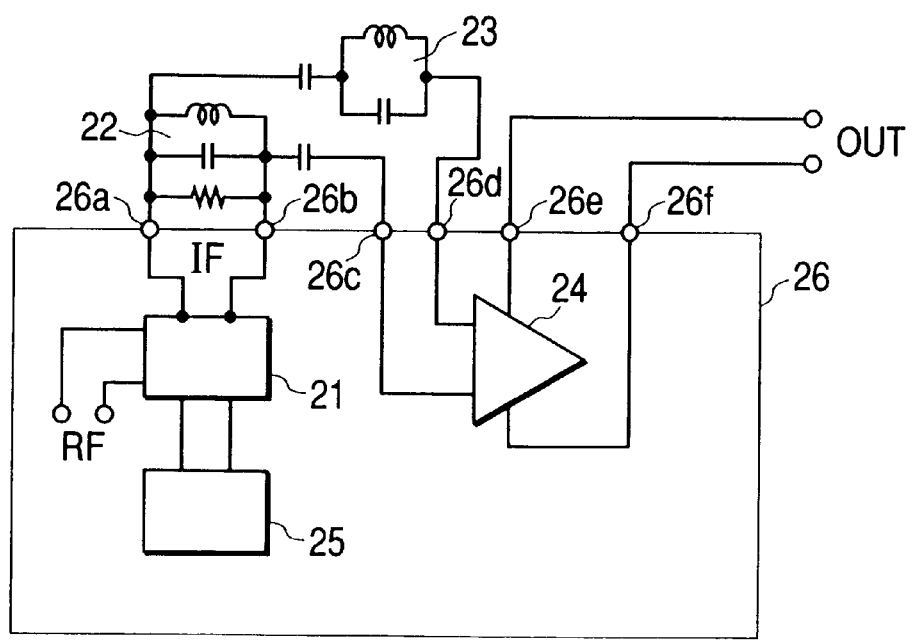
FIG. 7 is a circuit diagram of an intermediate frequency circuit in a conventional television tuner, configured using an integrated circuit component.
Figure 8:
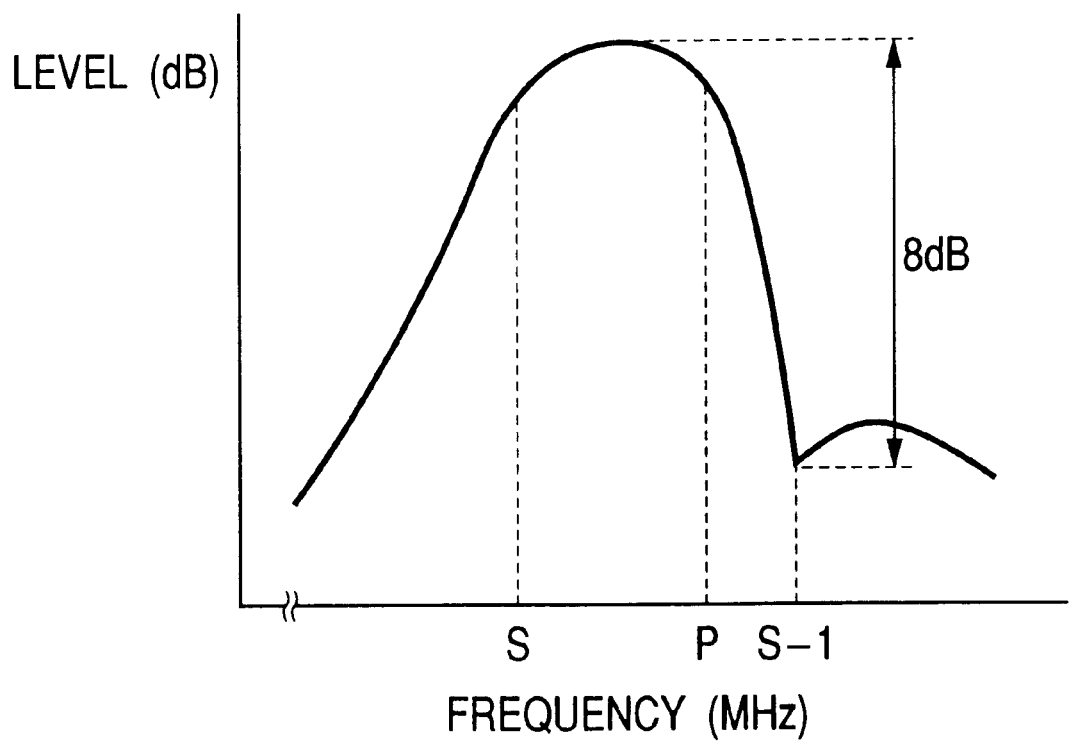
FIG. 8 is a frequency characteristic diagram of an intermediate frequency circuit in a conventional television tuner.

According to the frequency characteristic (response) of the intermediate frequency band in the intermediate frequency circuit of the present invention thus configured is as shown in FIG. 5, in which a video IF carrier, P, (58.75 MHz in the Japanese channel) and a audio IF carrier S (likewise, 54.25 MHz) are at almost the same level and the level of the audio IF carrier (S−1, 60.25 MHz) in an adjacent channel can be attenuated 13 dB or so with respect to a peak level, which corresponds to an increase of 5 dB as compared with the prior art.

Although in the above description the output side of the IF amplifier 4 is unbalanced and a negative feedback is applied to one input end of the IF amplifier 4, this constitutes no limitation. A modification maybe made in which the output side of the IF amplifier is balanced and a negative feedback is applied to each of the two input ends of the IF amplifier 4.

Although the portion from the mixer 1 up to the IF amplifier 4 is constituted by a balanced circuit, it may be constituted of an unbalanced circuit.

As set forth above, the intermediate frequency circuit in a television tuner according to the present invention comprises a mixer which outputs an intermediate frequency signal, an intermediate frequency amplifier for amplifying the intermediate frequency signal outputted from the mixer, and a feedback circuit disposed between an input end and an output end of the intermediate frequency amplifier, and in the intermediate frequency circuit being considered, a audio IF carrier of an adjacent intermediate frequency signal adjacent to the intermediate frequency signal is fed back from the output end to the input end of the intermediate frequency amplifier by the feedback circuit. Consequently, it is possible to greatly attenuate the audio IF carrier of the adjacent intermediate frequency signal.

In the intermediate frequency circuit according to the present invention, moreover, the feedback circuit is constituted of a series resonance circuit connected between the input and output ends of the intermediate frequency amplifier and a resonance frequency of the series resonance circuit is made coincident with the frequency of the audio IF carrier. Thus, the attenuation value can be made large with use of a feedback circuit of a simple structure.

Further, in the intermediate frequency circuit according to the present invention, a parallel resonance circuit is connected between the input end of the intermediate frequency amplifier and the ground, a coupling coil is inductively coupled to a resonance coil in the parallel resonance circuit and is connected at one end thereof to the output end of the intermediate frequency amplifier, an amplified intermediate frequency signal is taken out from an opposite end of the coupling coil, the feedback circuit is constituted of both the parallel resonance circuit and the coupling coil, and a resonance frequency of the parallel resonance circuit is made coincident with the frequency of the audio IF carrier. Consequently, it is possible to enlarge the attenuation value.

Additionally, in the intermediate frequency circuit according to the present invention, since a low-pass filter is provided at the output end of the intermediate frequency amplifier and a coil of the low-pass filter is used also as the coupling coil, it is possible to reduce the number of parts used.

What is claimed is:

1. An intermediate frequency circuit in a television tuner comprising:

a mixer which outputs an intermediate frequency signal;

an intermediate frequency amplifier to amplify the intermediate frequency signal outputted from the mixer;

a feedback circuit consisting of a series resonant circuit, with the a resonance frequency of said circuit being coincident with a frequency of the audio IF carrier, said resonant circuit comprising a coil and capacitor;

wherein an audio IF carrier of an adjacent intermediate frequency signal adjacent to the intermediate frequency signal is fed back from the output end to the input end by the feedback circuit.

2. An intermediate frequency circuit in a television tuner comprising:

a mixer which outputs an intermediate frequency signal;

an intermediate frequency amplifier to amplify the intermediate frequency signal outputted from the mixer;

a feedback circuit wherein a parallel resonance circuit is connected between the input end of the intermediate frequency amplifier and ground;

a coupling coil is inductively coupled to a resonance coil in said resonance circuit and is connected at one end thereof to the output end of the intermediate frequency amplifier; and amplified intermediate frequency signal is extracted from an opposite end of the coupling coil, the feedback circuit comprises both the parallel resonance circuit and the coupling coil, and a resonance frequency of the parallel resonance circuit is coincident with the frequency of the audio IF carrier.

3. An intermediate frequency circuit in a television tuner according to claim 2, wherein a low-pass filter is provided at the output end of the intermediate frequency amplifier, and a coil of the low-pass filter also serves as the coupling coil.

* * * * *

UNITED STATES PATENT AND TRADEMARK OFFICE
CERTIFICATE OF CORRECTION

PATENT NO. : 6,583,826 B1
DATED : June 24, 2003
INVENTOR(S) : Hiroyuki Sawamoto et al.

It is certified that error appears in the above-identified patent and that said Letters Patent is hereby corrected as shown below:

<u>Column 6,</u>
Line 41, insert -- an -- before "amplified".

Signed and Sealed this

Thirteenth Day of January, 2004

JON W. DUDAS
*Acting Director of the United States Patent and Trademark Office*